US012801412B2

(12) United States Patent
Imms

(10) Patent No.: US 12,801,412 B2
(45) Date of Patent: Nov. 17, 2026

(54) NATIVE UI AUTOCOMPLETION THROUGH DIRECT COMMUNICATION WITH THE SHELL

(71) Applicant: MICROSOFT TECHNOLOGY LICENSING, LLC., Redmond, WA (US)

(72) Inventor: Daniel John Imms, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/898,353

(22) Filed: Aug. 29, 2022

(65) Prior Publication Data

US 2024/0069940 A1 Feb. 29, 2024

(51) Int. Cl.
*G06F 9/44* (2018.01)
*G06F 9/455* (2018.01)
*G06F 13/10* (2006.01)

(52) U.S. Cl.
CPC ...... *G06F 9/45512* (2013.01); *G06F 9/45558* (2013.01); *G06F 13/107* (2013.01); *G06F 2009/45579* (2013.01)

(58) Field of Classification Search
CPC ............. G06F 9/45512; G06F 9/45558; G06F 13/107; G06F 2009/45579
See application file for complete search history.

(56) References Cited

U.S. PATENT DOCUMENTS

2008/0155565 A1 6/2008 Poduri
2009/0228821 A1* 9/2009 Tapper ...................... G06F 9/54 718/1
2011/0177792 A1* 7/2011 Bruno ...................... H04M 1/66 455/418
2012/0239540 A1* 9/2012 Rogers, Jr. .......... G06F 21/6245 726/26
2013/0080514 A1* 3/2013 Gupta ...................... G06F 9/451 709/203
2017/0109356 A1* 4/2017 Sawal ...................... G06F 9/453
2018/0276369 A1* 9/2018 Anderson ............... G06F 21/51

(Continued)

FOREIGN PATENT DOCUMENTS

GB 2633879 A 3/2025

OTHER PUBLICATIONS

International Search Report and Written Opinion received for PCT Application No. PCT/US23/029158, Nov. 21, 2023, 14 pages.

(Continued)

*Primary Examiner* — Bradley A Teets
*Assistant Examiner* — Lenin Paulino
(74) *Attorney, Agent, or Firm* — Workman Nydegger

(57) ABSTRACT

An autocompletion feature for a command line interface communicates directly with the shell to obtain candidates to complete a partially-formed CLI command. A terminal emulator generates autocompletion request sequences that are intercepted by a custom shell script integrated with the shell. The custom shell script uses its own autocompletion engine and a CLI command repository with the most current and historical versions of the CLI command structure to obtain autocompletion candidates. In this manner, the shell may be hosted in a remote device or in a separate execution environment without impacting the device hosting the terminal emulator for updates to the CLI command structure.

20 Claims, 6 Drawing Sheets

(56) References Cited

U.S. PATENT DOCUMENTS

| | | | | |
|---|---|---|---|---|
| 2020/0142714 | A1* | 5/2020 | Navarro | G06F 9/44526 |
| 2021/0089138 | A1* | 3/2021 | Imms | G06F 13/107 |
| 2022/0138334 | A1* | 5/2022 | Talmat | G06F 21/606 726/4 |
| 2022/0263887 | A1* | 8/2022 | Kupisiewicz | H04L 67/08 |
| 2022/0269519 | A1* | 8/2022 | Chakraborti | G06F 40/35 |
| 2022/0365801 | A1* | 11/2022 | Kasso | G06F 9/45558 |
| 2023/0342551 | A1* | 10/2023 | Eberle | G06F 40/216 |

OTHER PUBLICATIONS

"The next-generation command line", Aug. 17, 2022, 11 Pages.
Raderschad, et al., "withfig / autocomplete", Aug. 11, 2022, 5 Pages.
Wilson, et al., "PowerShell Editor Services", Aug. 19, 2022, 6 Pages.
Communication pursuant to Article 94(3) Received in European Patent Application No. 23758459.4, mailed on Mar. 4, 2026, 06 pages.
Communication under Rule 71(3) EPC, Received for European Application No. 23758459.4, mailed on Jul. 17, 2026, 8 pages.

* cited by examiner

NATIVE UI AUTOCOMPLETION THROUGH DIRECT COMMUNICATION WITH THE SHELL

BACKGROUND

A command line interface (CLI) is a user interface in which a user enters commands in the form of a string of text characters. The command line interface is a text-based interface in which the commands are manually typed. The command line interface accepts commands in a designated input field which are then executed by a shell program. This type of user interface is advantageous over a graphical user interface (GUI) where a user uses a mouse or fingers to click images of icons to access files or programs and/or to execute various operations. The command line interface is faster and more efficient than a GUI since it is composable, that is several tasks can be specified in a single text string thereby eliminating numerous interactions with the GUI.

The commands of the command line interface are interpreted by the shell program. The shell program or shell is a command line interpreter that executes the commands from the command line interface and outputs the results. The shell runs in a layer on top of the operating system kernel and is an interface between the user and the services of the operating system. The shell is accessed through a terminal emulator that resides in a user process. The terminal emulator is a computer program that emulates the keyboard and monitor of a hardware terminal. The terminal emulator accepts the user's input from the CLI, which is passed on to the shell, and outputs the results from the shell.

The use of a command line interface requires a user to be familiar with the commands supported by the command line interface and the correct syntax of the commands. The availability of good reference documentation for the commands may be limited and may change dynamically. This is often a problem when there are a large number of commands with various sub-commands and parameters which may be used in numerous ways.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An autocompletion feature for a command line interface communicates directly with the shell to obtain autocompletion candidates to complete a partially-formed CLI command. The autocompletion candidates are displayed in the CLI in the native user interface (UI) of the application hosting the terminal emulator in order to provide a unified user experience.

The terminal emulator generates autocompletion request sequences that are transmitted to the shell through an existing secure communication link. The terminal emulator and the shell may exist in separate computing devices or in separate execution environments of the same computing device.

The autocompletion request sequence is intercepted by a custom shell script that is integrated with the shell. The custom shell script uses its own autocompletion engine and a CLI command repository with the most current and historical versions of the CLI command structure to generate autocompletion candidates for the partially-formed CLI command. The custom shell script returns the autocompletion candidates in an autocompletion response request. The terminal emulator recognizes the autocompletion response request and displays the autocompletion candidates using the native user interface.

These and other features and advantages will be apparent from a reading of the following detailed description and a review of the associated drawings. It is to be understood that both the foregoing general description and the following detailed description are explanatory only and are not restrictive of embodiments as claimed.

DETAILED DESCRIPTION

Overview

Figure 1:
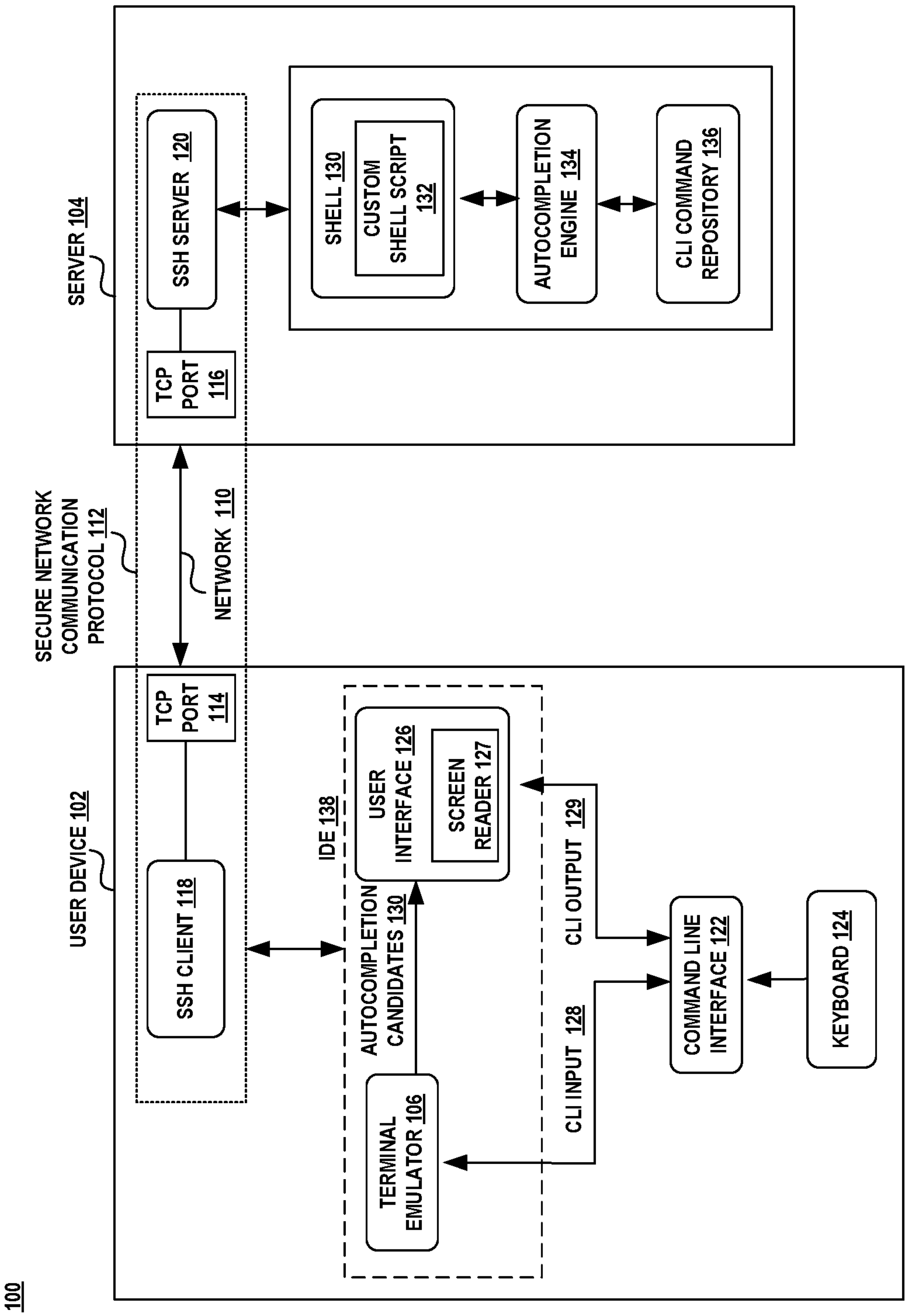
FIG. 1 is a schematic diagram illustrating a first exemplary native UI autocompletion system using direct communication with the shell over a secure network.

The embodiments disclosed herein pertain to an autocompletion feature for a command line interface that obtains autocompletion candidates or suggestions for a partially-formed command through direct communication with the shell. In addition, the autocompletion feature preserves the native user interface of the application hosting the terminal emulator in order to provide a unified user experience.

A CLI receives user input through a terminal emulator. Upon detection of a trigger character from the CLI representing an autocompletion request, the terminal emulator generates an autocompletion request sequence that is transmitted directly to the shell. The shell hosts a custom shell script that intercepts the transmissions of the autocompletion request sequence to the shell. The custom shell script recognizes the autocompletion request sequence since it includes an escape sequence and a partially-formed command. The escape sequence is ignored by the shell yet understood by the custom shell script. The custom shell script generates the autocompletion candidates from an autocompletion engine. The autocompletion engine interacts with a CLI command repository to search for candidates given the partially-formed command. The custom shell script constructs an autocompletion response sequence that includes an escape sequence and the autocompletion candidates.

The terminal emulator receives the autocompletion response sequence which is displayed in the CLI using the native UI of the application hosting the terminal emulator, such as the operating system or an integrated development environment (IDE). A terminal emulator typically displays text plainly without incorporating the features of the native UI, such as pop-up windows, list boxes, dropdown lists, etc.

The use of the features of the native UI ensures that the user has the same user experience with the application hosting the terminal emulator.

In addition, the plain text display of the traditional terminal emulators is not accessible to screen readers which considers the autocompletion candidates as random text under the command prompt. The native UI includes a screen reader that is capable of presenting the autocompletion candidates verbally. A screen reader is a software program that assists visually-impaired users to use a computer. The screen reader uses a Text-To-Speech (TTS) program to translate information displayed on a screen into speech which can be heard through earphones or speakers. Examples of a screen reader include Jaws and Windows Eyes which are Windows operating system-based screen readers.

In one aspect, the shell is hosted in a remote server and the terminal emulator is hosted in a user device. Alternatively, the terminal emulator may be hosted in a user process (i.e., virtual machine, execution environment) and the shell may be hosted in a shell process (i.e., virtual machine, execution environment) separate from the user process. The generation of the autocompletion candidates in the remote server or shell process results in more accurate results being produced since the CLI command repository may be updated with new versions of the CLI without affecting the user's device or user process. Additionally, the custom shell script is installed with the shell and as such, does not need a separate installation step. The communications between the shell and the terminal emulator use the existing communications links and protocols without requiring an additional setup.

In another aspect, the terminal emulator may be hosted by an integrated development environment. The IDE may use the native user interface (UI) of the operating system. The native UI uses the default control and components of the operating system's user interface. The technique described herein preserves the native UI in order to provide a unified and consistent user experience. This is achieved by the use of the escape sequence in the autocompletion response sequence which the terminal emulator recognizes and uses the native UI to display the autocompletion candidates.

Attention now turns to a more detailed description of the system, method, and devices of the native UI autocompletion through direct communication with the shell.

System

FIG. 1 illustrates a first exemplary configuration of the CLI autocompletion system 100. In this embodiment, the shell 130 is hosted in a remote server 104 and the terminal emulator 106 is hosted in a user device 102. The terminal emulator 106 and the shell 130 communicate across an Internet Protocol based network 110 using a secure network communication protocol 112. In one embodiment, the secure network communication protocol 112 is the Secure Shell (SSH) protocol which is a security protocol over the Transfer Control Protocol (TCP) and the Internet Protocol (IP). The SSH protocol 112 provides encryption and integrity of the data and authentication of the sender and receiver of the data.

The SSH protocol 112 can be used by any network providing reliable data streams. A protocol providing a reliable data stream ensures that the data packets are received in the sending order and that all sent data packets are received under normal conditions.

A SSH protocol session is between two TCP endpoints or ports 114, 116 associated with a respective SSH client 118 or SSH server 120. The SSH client 118 is a program that facilitates secure and authenticated SSH communications with a SSH server 120. The SSH session starts with a TCP connection that is established between the two endpoints 114, 116 for an initial key exchange. Thereafter the endpoints authenticate each other and establish various security parameters by transmitting protocol messages over the TCP connection. After a successful authentication and security parameter exchange, the security parameters define encryption and data integrity algorithms that are used for the SSH packets transmitted over the TCP connection.

It should be noted that the techniques described herein are not limited to the SSH protocol and that other secure communication protocols may be used, such as without limitation, Windows Subsystem for Linux (WSL), remote IDE connections, etc.

The user device 102 includes the terminal emulator 106 which is communicatively coupled to the SSH client 118, the CLI 122, a keyboard 124 and a user interface 126. The terminal emulator 106 accepts the user's text input from the CLI 128 through the keyboard or keyboard bindings 124. A computer keyboard or keyboard 124 is a peripheral input device that allows a user to input letters, characters, numbers and other symbols into a computer. Keyboard bindings are keyboard shortcuts. The terminal emulator 106 accepts the user input from the CLI 128 which is converted into a sequence with special characters and transmitted through the network 110 to the remote shell 130. The terminal emulator 106 receives a response with the autocompletion candidates 130 which is presented to the user, CLI output 129, in the CLI 122 through the user interface 126.

The user interface 126 includes a screen reader 127 that when activated receives the autocompletion candidates 130 and transforms them into speech which can be heard through speakers or headphones. In some instances, the screen reader is utilized with a Braille display that converts the text of the autocompletion candidates to Braille letters.

The remote server 104 includes a SSH server 120 and TCP port 116 that facilitates communication with the SSH client 118 of the user's device 102. The remote server 104 includes the shell 130 integrated with a custom shell script 132, an autocompletion engine 134, and a CLI command repository 136. The shell 130 is the command line interpreter. There are various types of shell programs that may be used, such as without limitation, Bourne Again Shell (BASH), PowerShell, etc.

The custom shell script 132 is a script that intercepts the input transmitted to the shell to detect the autocompletion request sequence. The custom shell script 132 then invokes the autocompletion engine 134 to obtain the autocompletion candidates, and to generate the autocompletion response sequence.

The autocompletion engine 134 searches for the autocompletion candidates using the partially-formed command received in the autocompletion request sequence. The partially-formed command may include a single text character or a string of text characters. These characters are used to search the CLI command repository 136 for commands that include the string of characters.

In an aspect, the terminal emulator 106 may be part of an integrated development environment (IDE) 138. The IDE 138 is a collection of programs used to develop and test software programs. The IDE 138 typically includes source code editors, compilers, debuggers, build automation tools, and other programs. Autocompletion is embodied as a tool or feature that can be an add-on, plug-in, extension and/or component of an IDE.

Figure 2:
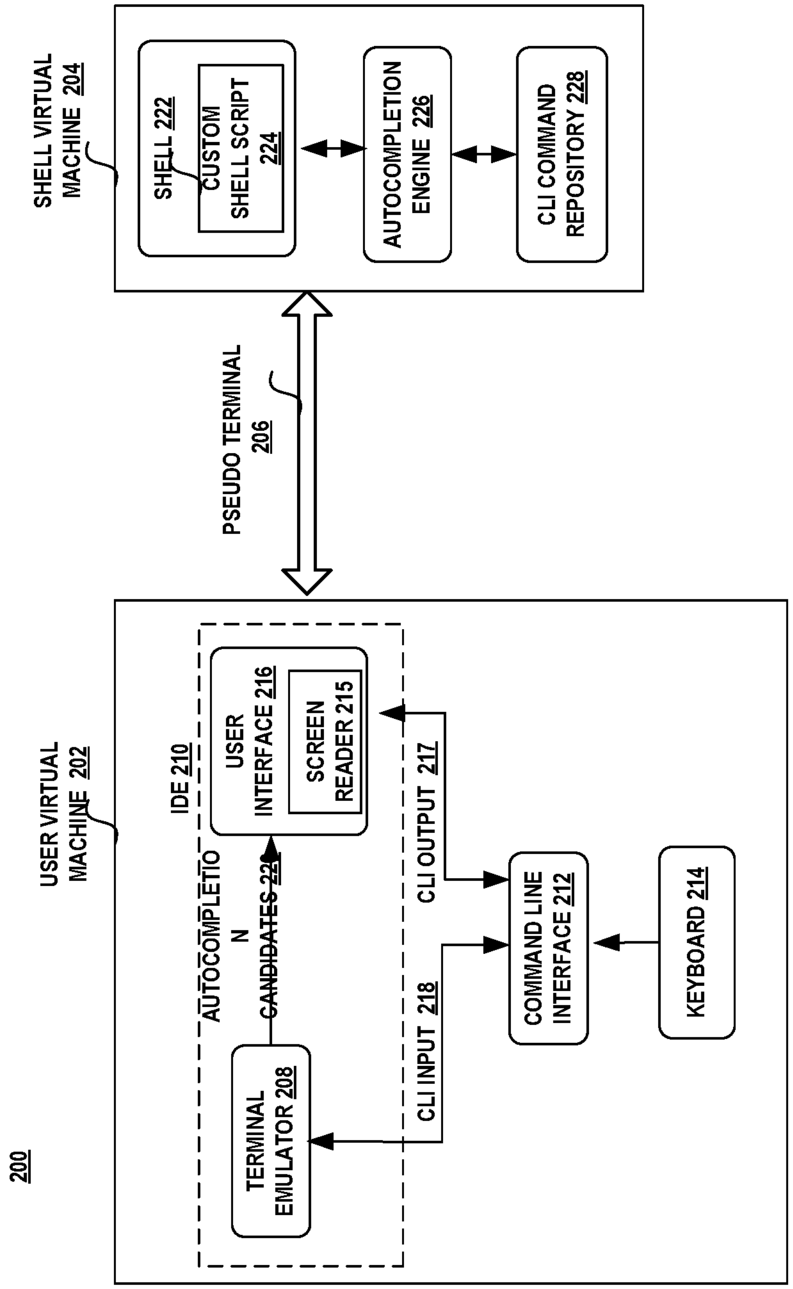
FIG. 2 is a schematic diagram illustrating a second exemplary native UI autocompletion system using direct communication with the shell over a pseudo terminal.

FIG. 2 illustrates a second exemplary configuration of the CLI autocompletion system 200. In this configuration, the terminal emulator 208 resides in a separate execution environment from the shell. An execution environment includes an instance of a computer program that executes in isolation without affecting other executing processes. In one aspect, an execution environment is a virtual machine. A virtual machine is a virtualization of a computer system created using software on one physical computer to emulate the functionality of another separate physical computer. The virtual machine includes a host operating system and the dedicated resources needed to execute an instance of a computer program.

For example, as shown in FIG. 2, a user virtual machine 202 hosts the terminal emulator 208 and a shell virtual machine 204 hosts the shell 222. The virtual machines 202, 204 may be hosted by the same physical computing device. The virtual machines 202, 204 communicate through a pseudo terminal 206. The pseudo terminal 206 uses an inter process communication (IPC) protocol.

The IPC protocol allows the execution environments to communicate with each other and to synchronize their actions. In one aspect, the IPC protocol may be implemented through shared memory or through memory passing. In the shared memory implementation, the operating system maps a memory segment in the address space of both of the terminal and shell execution environments, so that the processes in these execution environments can read and write in that memory segment without calling operating system functions. In the memory passing implementation, the terminal emulator and the shell do not share a memory segment and instead communicate through messages passed between the two processes.

The user virtual machine 202 includes an instance of the terminal emulator 208 which may be hosted in an IDE 210. The terminal emulator 208 is communicatively coupled to a command line interface 212, a keyboard 214, and a user interface 216. The user interface 216 may be part of the operating system or part of the IDE 210. The terminal emulator 208 accepts input from the CLI 218 and returns autocompletion candidates 220 in response to an autocompletion request. The autocompletion candidates 220 are formatted to the user using the user interface 216 and output 217 to the command line interface 212.

The user interface 216 includes a screen reader 215 that when activated receives the autocompletion candidates 220 and transforms them into speech which can be heard through speakers or headphones. In some instances, the screen reader is utilized with a Braille display that converts the text of the autocompletion candidates to Braille letters.

The shell virtual machine 204 includes an instance of the shell 222, custom shell script 224, autocompletion engine 226 and the CLI command repository 228. The shell 222 receives the text input by the user into the CLI 212. The custom shell script 224 intercepts the input to detect an escape sequence which denotes an autocompletion request. The custom shell script then invokes the autocompletion engine 226 to generate the autocompletion candidates given a context, such as the partially-formed command, which is then transmitted back to the terminal emulator 208 in an autocompletion response sequence.

Figure 3:
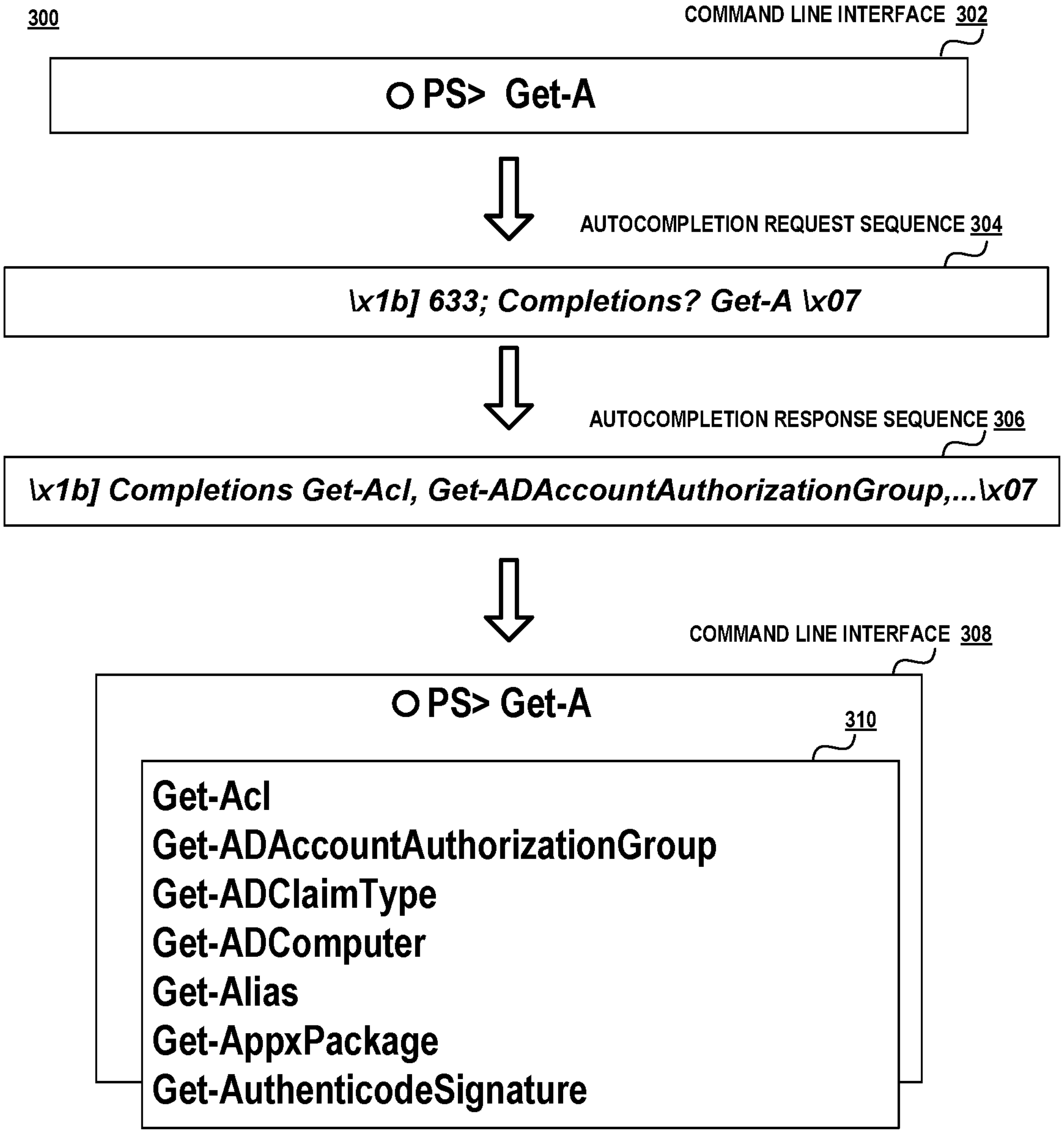
FIG. 3 is a schematic diagram illustrating an exemplary autocompletion request sequence and an exemplary autocompletion response sequence.

FIG. 3 illustrates an exemplary autocompletion request sequence 304 and an exemplary autocompletion response sequence 306. The autocompletion request sequence 304 and the autocompletion response sequence 306 are composed of a sequence of text characters. The text characters may be composed of ASCII characters or Unicode characters.

In one aspect, the autocompletion response sequence consists of the following: an operating system command (OSC), \x1b]; an OSC type, 633; a semicolon separator; an OSC data: Completions?; and an OSC terminator, \x07. The operating system command \x1b] includes the characters \x1b which denotes the "escape character" (ASCII 27) followed by a closing square bracket].

Turning to FIG. 3, at a user prompt, PS>, the partially-formed command Get-A is entered in the command line interface (block 302).

The terminal emulator parses the string of characters into an autocompletion request sequence which includes \x1b [633; Completions? Get-A \x07. The characters \x1b[represent an escape sequence which is a combination of characters that has a meaning other than the literal characters contained therein. The escape sequence cannot be printed onto a display. The escape sequence is recognized by the custom shell script and the terminal emulator. The text 633 represents an operating system command, the text Completions? represents an autocompletion request, the text Get-A represents the partially-formed command, and the characters \x07 represents an end-of-sequence code. (Collectively, block 304).

The custom shell script intercepts the autocompletion request sequence and initiates actions to generate autocompletion candidates, such as Get-Acl, Get-ADAccountAuthorizationGroup, Get-ADClaimType Get-ADComputer, Get-Alias, Get-AppxPackage, Get-AppxPackage, and Get-AuthenticodeSignature which are embedded in an autocompletion response sequence. The autocompletion response sequence, \x1b] Completions Get-Acl, Get-ADAccountAuthorizationGroup, . . . \x07, includes the escape sequence, \x1b], the autocompletion candidates and the end-of-sequence code \x07. (Collectively, block 306).

The terminal emulator receives the autocompletion response sequence and extracts the autocompletion candidates from the sequence. The autocompletion candidates are formatted for display in the command line interface using the native UI of the operating system or the IDE. The native UI may display the autocompletion candidates in a pop-up window 310 or in any other format used by the native UI. (Collectively, block 308).

Methods

Attention now turns to a description of the various exemplary methods that utilize the system and device disclosed herein. Operations for the embodiments may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more embodiments, the method illustrates operations for the systems and devices disclosed herein.

Figure 4:
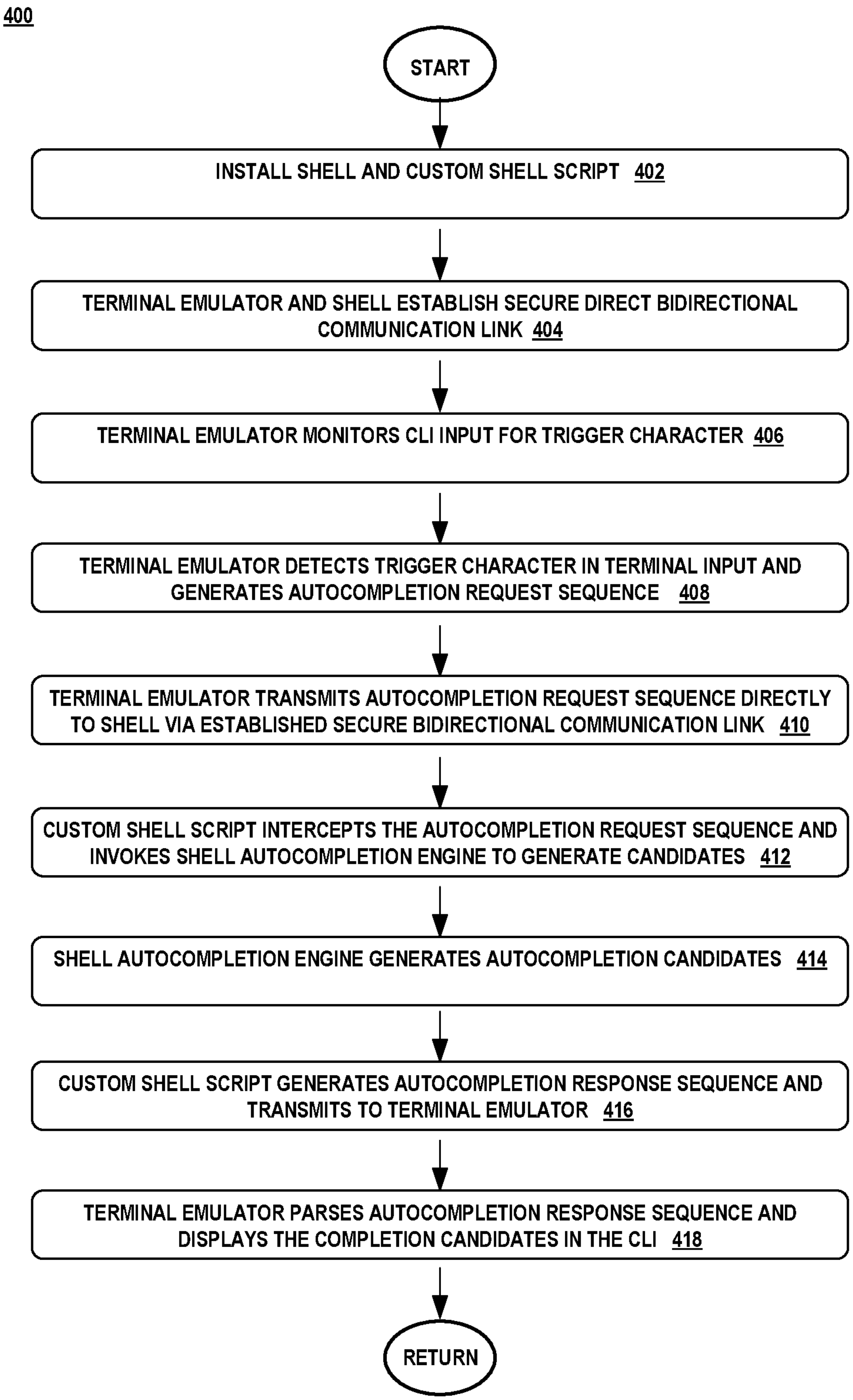
FIG. 4 is a flow diagram illustrating an exemplary method of the terminal emulator and the shell in generating autocompletion candidates for a CLI.

FIG. 4 is an exemplary method 400 of the autocompletion technique. Initially, the shell is downloaded onto a computing device with the custom shell script. The operating system of the user's computing device contains the command line interface and the terminal emulator (block 402).

The terminal emulator and the shell establish a secure direct bidirectional communication link when both systems are initialized. When the shell resides in a remote computing device, the direct bidirectional communication path operates over a secure network using a secure network protocol, such as SSH. When the terminal emulator and the shell reside in different virtual machines, the pseudo terminal is used to facilitate secure bidirectional communication between the two virtual machines. (Collectively, block 404).

The terminal emulator continuously monitors the text data received through the CLI. When the terminal emulator detects a trigger character, the terminal emulator knows that the user needs assistance in completing a CLI command. In one aspect, the trigger character is a blank space inserted after a partially-formed CLI command which may include one or more characters input into the CLI. (Collectively, block 406).

When the terminal emulator detects the trigger character in the CLI input, the terminal emulator generates the autocompletion request sequence. The autocompletion request sequence includes the escape sequence, a completion request action, and the partially-formed command. (Collectively, block 408).

The terminal emulator transmits the autocompletion request sequence to the shell through the established secure direct bidirectional communication path (block 410).

The custom shell script intercepts the communications transmitted to the shell to receive those transmissions containing the escape sequence. The shell ignores the communications containing the escape sequence. The custom shell script parses the autocompletion request sequence to extract the partially-formed command. The custom shell script invokes the autocompletion engine to generate one or more autocompletion candidates given the partially-formed command. (Collectively, block 412).

The autocompletion engine performs a search of the CLI command repository to find commands matching the partially-formed command. In one aspect, the CLI command repository is constructed as a search tree. The autocompletion engine uses a search tree algorithm to traverse the tree in a methodical pattern to find nodes matching the partially-formed command. (Collectively, block 414).

The custom shell script generates the autocompletion response sequence which is transmitted to the terminal emulator. The autocompletion response sequence includes the escape sequence and each of the retrieved autocompletion candidates. (Collectively, block 416).

The terminal emulator parses the autocompletion response sequence and detects the escape character. Upon detection of the escape character, the terminal emulator extracts the autocompletion candidates which are then displayed in the CLI in the native UI format of the operating system (block 418).

Technical Effect

The subject matter disclosed herein pertains to the technical problem of generating autocompletion candidates directly from the shell and in a manner that preserves the native UI of the operating system of the user device. The technical features associated with addressing this problem are the autocompletion request sequence, the autocompletion response sequence, and the custom shell script which facilitate the generation of autocompletion candidates directly from the shell and the terminal emulator that displays the candidates using the native UI.

There are several technical effects achieved by this technique. There is an improved functioning of the computer since updates to the CLI command structure are made to the shell without impacting the user device. The user device may have limited computing resources thereby limiting the storage of pre-configured lists of CLI commands on the user device.

The use of the native UI allows for a screen reader to be used which also improves the functioning of the computer since it is accessible to visually-impaired users. Additionally, the use of the native UI allows the candidates to be displayed with the existing native UI. This is beneficial for the situations where the terminal emulator is part of the IDE. The terminal emulator and the source code editor may have different UIs that may clash having the candidates unrecognizable or appearing haphazardly messy. Consistency in UI design creates a sense of control, familiarity, and reliability thereby improving the functioning of the computer for its users.

Exemplary Operating Environment

Figure 5:
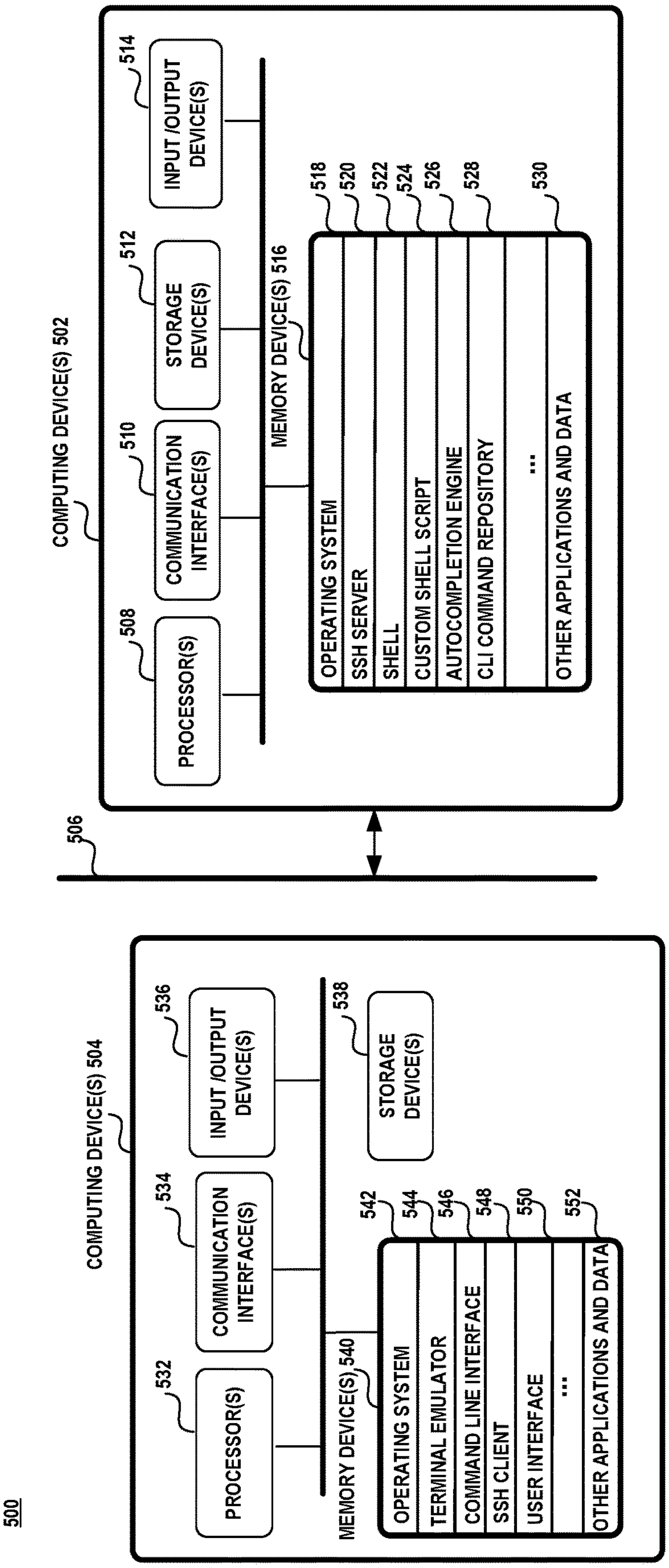
FIG. 5 is a block diagram illustrating a first exemplary operating environment.

Attention now turns to a discussion of the various exemplary operating environments. FIG. 5 illustrates a first exemplary operating environment 500 in which one or more computing devices 502 host the shell and one or more computing devices 504 host the terminal emulator. The operating environment 500 may be configured to host the shell as a cloud service where the terminal emulator is hosted on user devices communicatively coupled to the cloud service through a network. However, other configurations of the computing devices are possible and the operating environment is not limited to any particular configuration.

A computing device 502, 504 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multiprocessor environment, or a stand-alone computing device having access to remote or local storage devices.

A computing device 502, 504 may include one or more processors 508, 532, one or more communication interfaces 510,534, one or more storage devices 512, 538, one or more input/output devices 514, 536, and one or more memory devices 516, 540. A processor 508, 532 may be any commercially available or customized processor and may include dual microprocessors and multi-processor architectures. A communication interface 510, 534 facilitates wired or wireless communications between a computing device 502, 504 and other devices. A storage device 512, 538 may be computer-readable medium that does not contain propagating signals, such as modulated data signals transmitted through a carrier wave. Examples of a storage device 512, 538 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 512, 538 in a computing device 502, 504. The input/output devices 514, 536 may include a keyboard, mouse, pen, voice input device, touch input device, display, speakers, printers, etc., and any combination thereof.

A memory device or memory 516, 540 may be any non-transitory computer-readable storage medium that may store executable procedures, applications, and data. The computer-readable storage medium does not pertain to propagated signals, such as modulated data signals transmitted through a carrier wave. The computer-readable storage medium may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. Memory devices 516, 540 may also include one or more external storage devices or remotely located storage devices that do not pertain to propagated signals, such as modulated data signals transmitted through a carrier wave.

A memory device 516, 540 may contain instructions, components, and data. A component is a software program that performs a specific function and is otherwise known as a module, program, and/or application. Memory device 516 may include an operating system 518, a SSH server 520, a shell 522, a custom shell script 524, an autocompletion engine 526, a CLI command repository 528 and other applications and data 530. Memory device 540 includes an operating system 542, a terminal emulator 544, a command line interface 546, a SSH client 548, a user interface 500, and other applications and data 552.

A computing device 502, 504 may be communicatively coupled via a network 506. The network 506 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 506 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Figure 6:
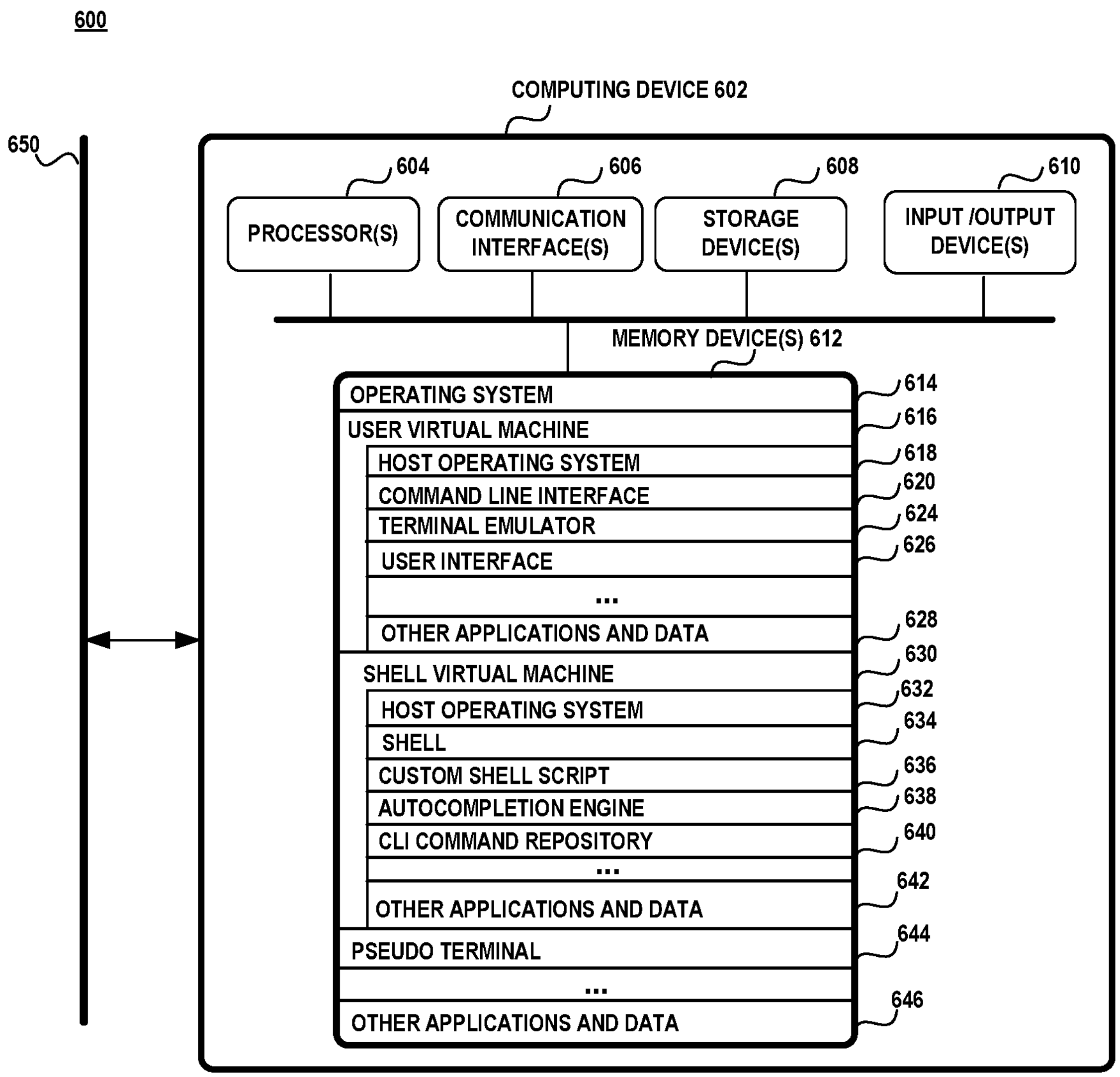
FIG. 6 is a block diagram illustrating a second exemplary operating environment.

FIG. 6 illustrates a second exemplary operating environment 600. In this embodiment, the terminal emulator and the shell are hosted in the same computing device 602 in different virtual machines 616, 630 communicatively coupled through a pseudo terminal 644. The computing device 602 includes one or more processors 604, one or more communication interfaces 606, one or more storage devices 608, one or more input/output devices 610, and one or more memory devices 612, each of which function as described above. The computing device 602 is connected to a network 650 which functions as described above.

Memory device 612 includes an operating system 614, a user virtual machine 616, a shell virtual machine 630, a pseudo terminal 644, and other applications and data 646. The user virtual machine 616 may include a host operating system 618, a command line interface, a terminal emulator 624, a user interface 626, and other applications and data 628. The shell virtual machine 630 may include a host operating system 632, a shell 634, a custom shell script 636, an autocompletion engine 638, a CLI command repository 640, and other applications and data 642.

CONCLUSION

A system is disclosed comprising one or more processors and a memory that stores one or more programs configured to be executed by the one or more processors. The one or more programs including instructions to perform acts that: establish a direct secure communication link between a terminal emulator and a shell; configure the terminal emulator to receive text input from a command line interface (CLI); detect, by the terminal emulator, a partially-formed CLI command entered into the CLI; generate, by the terminal emulator, an autocompletion request sequence including a first escape sequence and the partially-formed CLI command; transmit, by the terminal emulator, through the direct secure communication link, the autocompletion request sequence to the shell; receive, by the terminal emulator, an autocompletion response sequence including a second escape sequence and at least one autocompletion candidate; and display, by the terminal emulator, the at least one autocompletion candidate in the CLI.

In an aspect, the terminal emulator is hosted in a first computing device and the shell is hosted in a second computing device, wherein the first computing device and the second computing device differ. In another aspect, the terminal emulator is hosted by a first virtual machine and the shell is hosted in a second virtual machine, wherein the first virtual machine and the second virtual machine differ.

In an aspect, the terminal emulator and the shell communicate through a Secure Shell protocol and in another aspect, the terminal emulator and the shell communicate through a pseudo terminal. In an aspect, the terminal emulator is embedded in an integrated development environment (IDE). In an aspect, the one or more programs include further instructions to perform acts that: extract, by the terminal emulator, the second escape character in the autocompletion response sequence; and upon the terminal emulator recognizing the second escape character, display the at least one autocompletion candidate in the native user interface of the IDE.

A computer-implemented method is disclosed, comprising: integrating a custom shell script with a shell program of a command line interface (CLI); establishing a secure direct communication link between the shell program and a terminal emulator; receiving, from the secure direct communication link, an autocompletion request sequence destined to the shell program, the autocompletion request sequence including a first escape sequence and a partially-formed command; monitoring, by the custom shell script, communications destined to the shell program; intercepting, by the custom shell script, the autocompletion request sequence upon detection of the first escape sequence; obtaining, by the custom shell script, at least one candidate to complete the partially-formed command; generating, by the custom shell script, an autocompletion response sequence, the autocompletion response sequence including a second escape sequence and the at least one candidate; and transmitting, by the custom shell script, the autocompletion response sequence to the terminal emulator for display in the CLI.

In an aspect, the computer-implemented method further comprises: hosting the shell program in a first computing device; and hosting the terminal emulator in a second computing device, wherein the first computing device and the second computing device differ. In another aspect, the computer-implemented method, further comprises: hosting the shell program in a first virtual machine; and hosting the terminal emulator in a second virtual machine, wherein the first virtual machine and the second virtual machine differ.

In an aspect, the terminal emulator and the shell communicate through a Secure Shell protocol. In another aspect, the terminal emulator and the shell communicate through a pseudo terminal. In an aspect, the computer-implemented method of claim 8, further comprises hosting the terminal emulator in an integrated development environment (IDE). In an aspect, the computer-implemented method, further comprises: displaying the at least one candidate in the native user interface of the IDE. In an aspect, the custom shell script is integrated with the shell program.

Another computer-implemented method is disclosed, comprising: providing a terminal emulator to receive a command line interface (CLI) command that is interpreted by a shell program; configuring a custom shell script integrated with the shell program to recognize an escape sequence included in transmissions sent to the shell program, wherein the shell program ignores transmissions including the escape sequence; obtaining, by the custom shell script, an autocompletion request sequence transmitted from the terminal emulator, the autocompletion request sequence including the escape sequence and a request for autocompletion candidates for a partially-formed CLI command; accessing, by an autocompletion engine in the shell, a CLI command repository for the autocompletion candidates for the partially-formed CLI command; returning, to the terminal emulator, an autocompletion response sequence, wherein the autocompletion response sequence includes the escape sequence and the autocompletion candidates; and upon the terminal emulator recognizing the escape sequence in the autocompletion response sequence, displaying the autocompletion candidates in the CLI.

In an aspect, the computer-implemented method, further comprises: hosting the shell program in a remote device communicatively coupled to the terminal emulator through a network. In an aspect, the computer-implemented method, further comprises: hosting the shell program in a first virtual machine and the terminal emulator in a second virtual machine, wherein the shell program and the terminal emulator communicate through a pseudo terminal. In an aspect, the escape sequence includes an operating system command. In an aspect, the operating system command includes an escape character and a closing square bracket.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:

one or more processors; and one or more hardware storage devices that store instructions that are executable by the one or more processors to cause the system to:

establish a direct secure communication link between a terminal emulator and a shell of a command line interface (CLI), wherein the terminal emulator and the shell reside in different execution environments, wherein the terminal emulator is separate from a native user interface of an application hosting the terminal emulator, wherein the shell comprises a custom shell script, and wherein the custom shell script uses an autocompletion engine dedicated to the custom shell script to access an updated CLI command repository to generate autocompletion candidates to complete a partially-formed CLI command;

configure the terminal emulator to receive text input from the CLI;

detect, by the terminal emulator, text input that includes a partially-formed CLI command and that is entered into the CLI;

determine that the text input entered into the CLI includes a trigger character, wherein the trigger character is included in the input after the partially-formed CLI command, and wherein the trigger character, when detected by the terminal emulator, triggers the terminal emulator to generate an autocompletion request sequence;

generate, by the terminal emulator, the autocompletion request sequence, which is structured to include a first escape sequence and the partially-formed CLI command, wherein generation of the first escape sequence facilitates subsequent coordination between the terminal emulator and the custom shell script, said coordination involves the custom shell script triggering generation of the autocompletion candidates using the autocompletion engine and the updated CLI command repository;

transmit, by the terminal emulator, through the direct secure communication link, the autocompletion request sequence to the shell;

cause the custom shell script, which is hosted by the shell, to intercept the transmission of the autocomplete request sequence to the shell;

cause the custom shell script to recognize the autocompletion request sequence based on the custom shell script recognizing the first escape sequence and the partially-formed CLI command, wherein the first escape sequence is ignored by the shell despite being recognized by the custom shell script;

cause the custom shell script to generate the autocompletion candidates using the autocompletion engine, wherein the autocompletion engine interacts with the updated CLI command repository to search for the autocompletion candidates given the partially-formed CLI command;

cause the custom shell script to construct an autocompletion response sequence that includes a second escape sequence and at least one autocompletion candidate that completes the partially-formed CLI command from the updated CLI command repository;

receive, by the terminal emulator, the autocompletion response sequence; and display, by the terminal emulator, the at least one autocompletion candidate in the CLI.

2. The system of claim 1, wherein the terminal emulator is hosted in a first computing device and the shell is hosted in a second computing device, wherein the first computing device and the second computing device differ.

3. The system of claim 1, wherein the terminal emulator is hosted by a first virtual machine and the shell is hosted in a second virtual machine, wherein the first virtual machine and the second virtual machine differ.

4. The system of claim 2, wherein the terminal emulator and the shell communicate through a Secure Shell protocol.

5. The system of claim 3, wherein the terminal emulator and the shell communicate through a pseudo terminal.

6. The system of claim 1, wherein the terminal emulator is embedded in an integrated development environment (IDE).

7. The system of claim 6, wherein the instructions are further executable to cause the system to:

extract, by the terminal emulator, the second escape character in the autocompletion response sequence; and after the terminal emulator recognizes the second escape character, display the at least one autocompletion candidate in a native user interface of the IDE.

8. A computer-implemented method comprising:

accessing a shell program of a command line interface (CLI), wherein the shell program of the CLI comprises a custom shell script, wherein the custom shell script uses an autocompletion engine to access an updated CLI command repository to generate candidates to complete a partially-formed CLI command;

establishing a secure direct communication link between the shell program and a terminal emulator, wherein the shell program and the terminal emulator reside in different execution environments;

detecting text input that includes the partially-formed CLI command and that is entered into the CLI;

determining that the text input entered into the CLI includes a trigger character, wherein the trigger character is included in the input after the partially-formed CLI command, and wherein the trigger character, when detected by the terminal emulator, triggers the terminal emulator to generate an autocompletion request sequence;

receiving, from the secure direct communication link, an autocompletion request sequence destined to the shell program, the autocompletion request sequence including a first escape sequence and the partially-formed CLI command, wherein recognition of the first escape sequence facilitates subsequent coordination between the terminal emulator and the custom shell script, said coordination involves the custom shell script triggering generation of the candidates using the autocompletion engine and the updated CLI command repository;

monitoring, by the custom shell script, communications destined to the shell program;

intercepting, by the custom shell script, the autocompletion request sequence upon detection of the first escape sequence;

causing the custom shell script to recognize the autocompletion request sequence based on the custom shell script recognizing the first escape sequence and the partially-formed CLI command, wherein the first escape sequence is ignored by the shell despite being recognized by the custom shell script;

causing the custom shell script to generate the candidates using the autocompletion engine, wherein the autocompletion engine interacts with the updated CLI command repository to search for the candidates given the partially-formed CLI command;

causing the custom shell script to construct an autocompletion response sequence that includes a second escape sequence and at least one candidate that completes the partially-formed CLI command from the updated CLI command repository; and transmitting, by the custom shell script, the autocompletion response sequence to the terminal emulator for display in the CLI.

9. The computer-implemented method of claim 8, further comprising:

hosting the shell program in a first computing device; and hosting the terminal emulator in a second computing device, wherein the first computing device and the second computing device differ.

10. The computer-implemented method of claim 8, further comprising:

hosting the shell program in a first virtual machine; and hosting the terminal emulator in a second virtual machine, wherein the first virtual machine and the second virtual machine differ.

11. The computer-implemented method of claim 9, wherein the terminal emulator and the shell communicate through a Secure Shell protocol.

12. The computer-implemented method of claim 10, wherein the terminal emulator and the shell communicate through a pseudo terminal.

13. The computer-implemented method of claim 8, further comprising:

hosting the terminal emulator in an integrated development environment (IDE).

14. The computer-implemented method of claim 13, further comprising:

displaying the at least one candidate in the native user interface of the IDE.

15. The computer-implemented method of claim 8, wherein the second escape sequence includes an operating system command.

16. A computer-implemented method comprising:

providing a terminal emulator to receive a command line interface (CLI) command that is interpreted by a shell program, wherein the terminal emulator and the shell program operate in different execution environments;

configuring a custom shell script integrated into the shell program to recognize an escape sequence included in transmissions sent to the shell program, wherein the shell program ignores transmissions including the escape sequence, and wherein the custom shell script accesses an updated CLI command repository not utilized by the shell program;

detecting text input that includes a partially-formed CLI command and that is entered into the CLI;

determining that the text input entered into the CLI includes a trigger character, wherein the trigger character is included in the input after the partially-formed CLI command, and wherein the trigger character, when detected by the terminal emulator, triggers the terminal emulator to generate an autocompletion request sequence, wherein detection of the escape sequence facilitates subsequent coordination between the terminal emulator and the custom shell script, said coordination involves the custom shell script triggering generation of autocompletion candidates using an autocompletion engine and the updated CLI command repository;

causing the custom shell script, which is hosted by the shell, to intercept transmission of the autocomplete request sequence from the terminal emulator to the shell, wherein the autocompletion request sequence includes the escape sequence and a request for the autocompletion candidates for a partially-formed CLI command;

causing the custom shell script to recognize the autocompletion request sequence based on the custom shell script recognizing the escape sequence and the partially-formed CLI command, wherein the escape sequence is ignored by the shell despite being recognized by the custom shell script;

causing the custom shell script to generate the autocompletion candidates using the autocompletion engine, wherein the autocompletion engine interacts with the updated CLI command repository to search for the autocompletion candidates given the partially-formed CLI command;

causing the custom shell script to construct an autocompletion response sequence that includes a second escape sequence and at least one autocompletion candidate that completes the partially-formed CLI command from the updated CLI command repository;

returning, to the terminal emulator, the autocompletion response sequence; and upon the terminal emulator recognizing the second escape sequence in the autocompletion response sequence, displaying the at least one autocompletion candidate in the CLI.

17. The computer-implemented method of claim 16, further comprising:

hosting the shell program in a remote device communicatively coupled to the terminal emulator through a network.

18. The computer-implemented method of claim 16, further comprising:

hosting the shell program in a first virtual machine and the terminal emulator in a second virtual machine, wherein the shell program and the terminal emulator communicate through a pseudo terminal.

19. The computer-implemented method of claim 16, wherein the escape sequence includes an operating system command.

20. The computer-implemented method of claim 19, wherein the operating system command includes an escape character and a closing square bracket.

* * * * *